United States Patent
Gukal et al.

(10) Patent No.: US 9,779,005 B2
(45) Date of Patent: Oct. 3, 2017

(54) ANALYZING LOG STREAMS BASED ON CORRELATIONS BETWEEN DATA STRUCTURES OF DEFINED NODE TYPES

(71) Applicant: CA, INC., Islandia, NY (US)

(72) Inventors: Sreenivas Gukal, Santa Clara, CA (US); Sanjay Vyas, Fremont, CA (US)

(73) Assignee: CA, INC., Islandia, NY (US)

( * ) Notice: Subject to any disclaimer, the term of this patent is extended or adjusted under 35 U.S.C. 154(b) by 235 days.

(21) Appl. No.: 14/313,075

(22) Filed: Jun. 24, 2014

(65) Prior Publication Data

US 2015/0370842 A1    Dec. 24, 2015

(51) Int. Cl.
*G06F 17/30* (2006.01)
*G06F 11/32* (2006.01)
*G06F 11/34* (2006.01)
*G06F 11/30* (2006.01)

(52) U.S. Cl.
CPC ........ *G06F 11/321* (2013.01); *G06F 11/3051* (2013.01); *G06F 11/3072* (2013.01); *G06F 11/3476* (2013.01); *G06F 17/30705* (2013.01); *G06F 2201/86* (2013.01)

(58) Field of Classification Search
CPC ......... G06F 17/30312; G06F 17/30321; G06F 17/30339; G06F 11/3051; G06F 17/30705
USPC .......................... 707/709, 711, 749, 750, 751
See application file for complete search history.

(56) References Cited

U.S. PATENT DOCUMENTS

| | | | | |
|---|---|---|---|---|
| 7,702,640 | B1 * | 4/2010 | Vermeulen | G06F 17/30327 707/999.1 |
| 8,510,399 | B1 * | 8/2013 | Byttow | G06Q 10/10 707/770 |
| 9,256,667 | B2 * | 2/2016 | Koudas | G06F 17/30696 |
| 2005/0138413 | A1 * | 6/2005 | Lippmann | G06F 21/577 726/4 |
| 2007/0223699 | A1 * | 9/2007 | Jones | G06F 17/2785 707/E17.089 |
| 2009/0319518 | A1 * | 12/2009 | Koudas | G06F 17/30864 707/999.005 |
| 2015/0161237 | A1 * | 6/2015 | Agarwal | G06Q 10/10 707/749 |

* cited by examiner

*Primary Examiner* — Vincent F Boccio
(74) *Attorney, Agent, or Firm* — Sage Patent Group (57) ABSTRACT

A method by a log stream analysis computer includes identifying records of log streams within a log repository containing a defined term. The log streams are generated by respective software sources executed by the host nodes. Similarity values are determined to indicate similarity between content of the records containing the defined term. A term node is generated to contain a data structure that identifies the defined term and lists identities of the records and corresponding ones of the similarity values. Related log stream analysis computers are disclosed.

19 Claims, 5 Drawing Sheets

ANALYZING LOG STREAMS BASED ON CORRELATIONS BETWEEN DATA STRUCTURES OF DEFINED NODE TYPES

TECHNICAL FIELD

The present disclosure relates to computer systems and more particularly to operational analysis of computer equipment.

BACKGROUND

Data centers can contain thousands of servers (both physical and virtual machines), with each server running one or more software applications. The servers and software applications generate log stream records to indicate their current states and operations. For example, software applications may output log records that sequentially list actions that have been performed and/or list application state information at various checkpoints or when triggered by defined events (e.g., faults) occurrences, etc.

The software applications are also referred to as software sources because they are sources of log stream records. Servers are one type of host that can execute software sources. Some data centers generate terabytes of log stream records every day from thousands of software sources running on thousands of hosts.

Significant processing resources and/or time may be required to determine correlations among the log stream records. Data center operations engineers (operators) may need to frequently determine such correlations in an iterative manner to analyze the root cause of problems. Because a human is in the loop, it can be important to determine the correlations in a fast and intuitive manner.

SUMMARY

Some embodiments disclosed herein are directed to a method by a log stream analysis computer. The method includes identifying records of log streams within a log repository containing a defined term. The log streams are generated by respective software sources executed by the host nodes. Similarity values are determined to indicate similarity between content of the records containing the defined term. A term node is generated to contain a data structure that identifies the defined term and lists identities of the records and corresponding ones of the similarity values.

In a further embodiment, for each of a plurality of defined terms, the methods are repeated for identifying records, determining similarity values, and generating a term node. Different ones of the term nodes correspond to different ones of the defined terms are repeated. Correlation between content of records of log streams within the log repository is determined based on content of the data structure of the term nodes and a defined correlation rule.

Some other embodiments disclosed herein are directed to a log stream analysis computer that includes a processor and a memory coupled to the processor. The memory includes computer readable program code that when executed by the processor causes the processor to perform operations. The operations include identifying records of log streams within a log repository containing a defined term. The log streams are generated by respective software sources executed by the host nodes. The operations further include determining similarity values that indicate similarity between content of the records containing the defined term, and generating a term node containing a data structure that identifies the defined term and lists identities of the records and corresponding ones of the similarity values.

It is noted that aspects described with respect to one embodiment may be incorporated in different embodiments although not specifically described relative thereto. That is, all embodiments and/or features of any embodiments can be combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
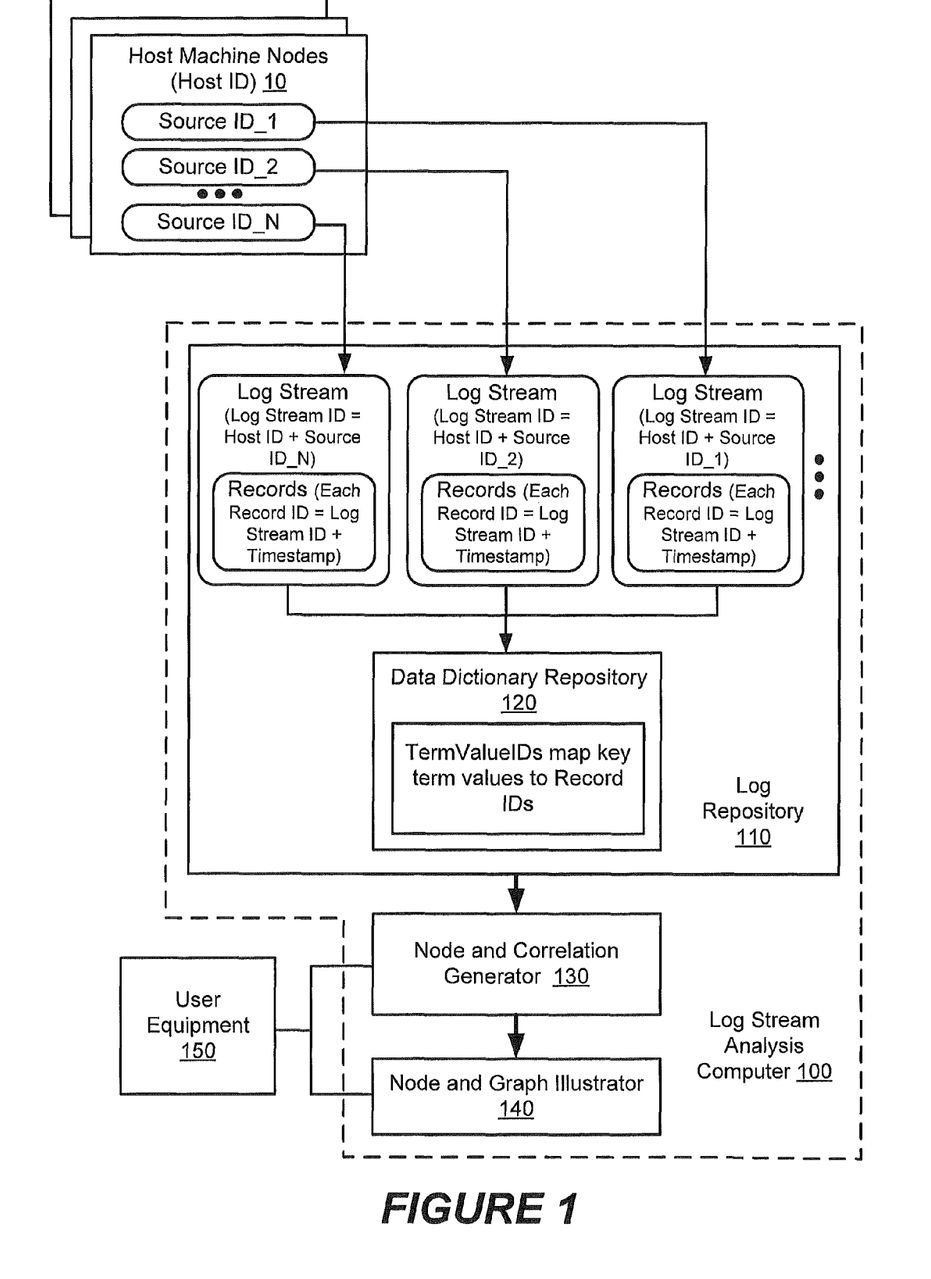
FIG. 1 is a block diagram of a system containing a log stream analysis computer that analyzes log streams generated by software sources executed by host nodes in accordance with some embodiments.

Some embodiments are disclosed herein in the context of the nonlimiting example block diagram of FIG. 1. A log stream analysis computer 100 receives log streams from one or more software sources executed by each of one or more host machine nodes 10. In the embodiment of FIG. 1, the log stream analysis computer 100 receives log streams from N different software sources (identified as Source ID_1, Source ID_2, . . . Source ID_N) executed by the host machine node 10 identified by a Host ID, and can further receive log streams from other software sources executed by other host machine nodes. A host machine node is also referred to as a "host node" and "host" for brevity.

A host machine node can include a physical host machine and/or a virtual machine (VM). The physical host machine includes circuitry that performs computer operations to execute one or more software sources. The physical host machine may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine may include computer resources such as: processor(s) (e.g., central processing unit, CPU); network interface(s); memory device(s); data mass storage device(s) (e.g., disk drives, solid state nonvolatile memory, etc.); etc.

A physical host machine can provide one or more VMs that execute one or more software sources. A virtual hypervisor can provide an interface between the one or more VMs and a host operating system that allows multiple guest operating systems and associated software sources to run concurrently on a physical host machine. The host operating system is responsible for the management and coordination of activities and the sharing of the computer resources of the physical host machine.

The log stream analysis computer 100 operates to identify records of the log streams within a log repository that contain a defined term. The term may be any portion of a record entry, such as a numeric value, alphanumeric, character, and/or string of a record entry. The log stream analysis computer 100 also operates to determine similarity values that indicate an amount of similarity between content of the records containing the defined term, and generates a term node containing a data structure that identifies the defined term and lists identities of the records and corresponding ones of the similarity values.

Figure 2:
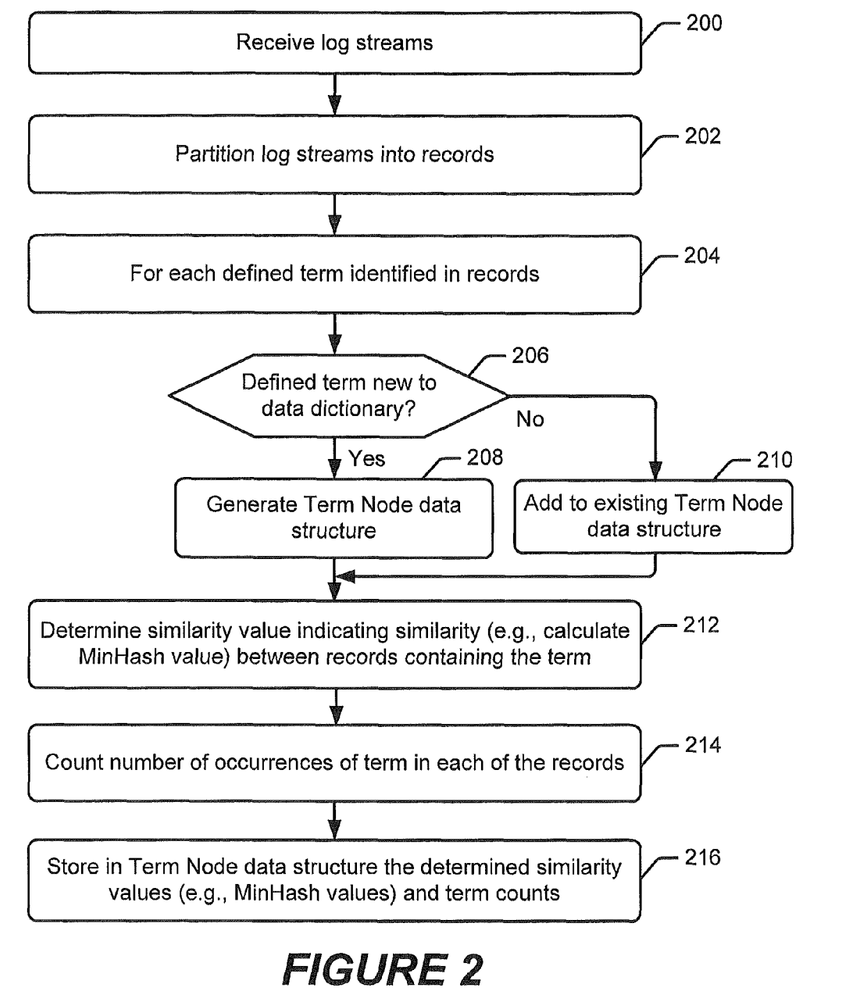
FIG. 2 is a flowchart of operations by a log stream analysis computer for generating data structures of term nodes in accordance with some embodiments.

FIG. 2 is a flowchart of further operations by a log stream analysis computer, such as the log stream analysis computer 100 of FIG. 1, for generating data structures of term nodes in accordance with some embodiments. Referring to FIGS. 1 and 2, the log stream analysis computer 100 receives (block 200) log streams from the software sources.

Each software source belongs to a source type. For example, a "SQL Server" may be a source type and each installation of SQL Server is a software source belonging to the source type. Multiple sources of the same or different source types may be on the same host, and a software source may migrate between hosts. Each host and software source is identified by a unique identifier, Host ID and Source ID respectively. A log stream (generated by a software source of a particular host) can be uniquely identified by a compound identifier generated from combination of the Host ID and Source ID.

In the embodiment of FIG. 1, one software source executed by the host outputs a log stream uniquely identified (Log Stream ID) as a combination of an identifier of the host (Host ID) and an identifier of the software source (Source ID_1). Another software source executed by the host outputs a log stream uniquely identified (Log Stream ID) as a combination of an identifier of the host (Host ID) and an identifier of the software source (Source ID_2). Similarly, an n'th software source executed by the host outputs a log stream uniquely identified (Log Stream ID) as a combination of an identifier of the host (Host ID) and an identifier of the software source (Source ID_N). Other hosts would be identified by different Host IDs.

The log stream analysis computer 100 partitions (block 202) the received log streams into corresponding records according to a defined time interval (e.g., a defined number of minutes or hours) or other defined event or rule. The records are stored in a log repository 110. Each record may be uniquely identified by an identifier (Record ID) that is formed from a combination (e.g., concatenation) of the corresponding (Log Stream ID) from which the record was partitioned and a timestamp associated with the defined time interval or other defined event or rule. The interval size can be determined based on a trade-off analysis between storage space requirements and accuracy.

A data dictionary repository 120 may be generated and updated responsive to the content of incoming log streams. Unique strings or other terms contained in records can be stored in the data dictionary repository 120. The data dictionary repository can function not only as a term reference dictionary, but moreover to map the strings or other terms to defined identifiers. All string values or other terms can be replaced by corresponding integer identifiers from the data dictionary repository 120.

With continuing reference to FIG. 2, the log stream analysis computer 100 or another processing element of the system identifies terms in the records and selectively stores the terms in the data dictionary repository 120. For example, a term that satisfies a defined rule (e.g., term not yet present in the repository 120) can cause a Term Value ID to be generated that uniquely identifies the term. The Term Value ID, the term, and a record identifier in which the term was located can be stored in the data dictionary repository 120. The data dictionary repository 120 thereby provides logical mappings between Term Value IDs and corresponding terms and record identifiers.

The defined rule operates to allow only certain defined terms to be added to the data dictionary repository 120 when they appear in a record. These terms may be defined by a user and may include, for example, user login names, host names, and/or operational error identifiers. The terms may alternatively or additionally be defined based on their occurrence in less than a defined number of records in the interval (e.g., terms having a high level of entropy). Alternatively or additionally, the terms may be defined based on a defined position in a record, where the defined position may be identified by a preprocessing step that marks that position as important for monitoring and/or the defined position may be identified based on the term being observed as repetitively occurring in the same position in a threshold number of the log records.

In the embodiment of FIG. 2, for each defined term identified in the records, a determination (block 206) is made as to whether the term is new to the data dictionary repository 120. When the term is new, a term node data structure is generated (block 208). Otherwise, when the term is not new, information is added (block 210) to the data structure of an existing term node.

Accordingly, for each defined term that is determined to reside in one or more of the records, a term node is generated which may be provided for graphical display on a display device to a user. The term node contains information identifying the defined term, which records it is contained within, values indicating similarity between the records containing the term, and may further include a separate count of the number of occurrences of the defined term in each of the records containing the defined term.

In the embodiment of FIG. 2, a similarity value is determined (block 212) that indicates the similarity between records containing the defined term, and a stored (block 216) in the data structure of a term node. In one embodiment, for example, if two defined terms occur in the same log stream and in the same time period then the similarity values can be compared to determine how frequently these two values occur together in that log stream.

Similarity values may be calculated as min-wise independent permutation locality sensitive hashing (MinHash) values of content of the records containing the defined term. The MinHash values may be calculated for each defined term in each log stream, determined over the Record IDs of the records in which that defined term occurs. The MinHash operations may be performed using one or more publicly available techniques, but applied according to embodiments disclosed herein to determine similarity values.

The MinHash values can be stored (block 216) in the data structure of the term node. MinHashes are very small data structures and hence are storage efficient values that can be included in the data structures of term nodes to indicate similarities.

The number of occurrences of the defined term in each of the records containing a defined term may be counted (block 214), and the number of occurrences may be stored (block 216) in the data structure of the term node associated with the corresponding ones of the records (i.e., each record is associated with a count of the number of occurrences of the defined term in that record).

An example data structure of a term node is shown below and in the embodiment of FIG. 3. Each term node can contain an identifier for the defined term (e.g., TermID identifying the term in the data dictionary repository 120), and a list of summaries for the records corresponding to a defined term for each time period or other record interval. Each summary can contain the time period, the stream identifier, record count, and a MinHash structure, such as shown below:

| Term Node |
|---|
| TermID<br>List of <Time Period (Record ID)<br>    SourceID+HostID (Log stream ID)<br>    Count value (of all Record IDs that contain the defined term)<br>    MinHash (of all Record IDs that contain the defined term)<br>    > |

Figure 3:
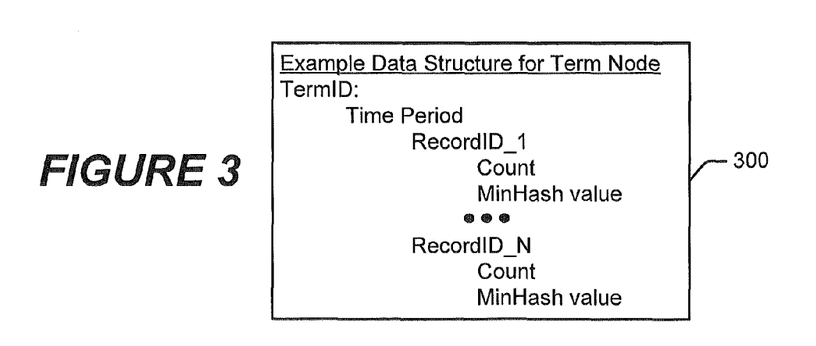
FIG. 3 illustrates an example data structure of a term node according to one embodiment.

In FIG. 3, the example data structure 300 for a term node identifies for each TermID, the time period, the corresponding Record IDs occurring within the time period. For each of the Record IDs, the data structure further identifies the count value and the MinHash.

Further explanation by way of example, assume a user desires to identify correlations between records corresponding to 10:00-10:30 am that have Term1 defined by the user. The computer 100 can determine that Term1 occurs in 5 Log Stream IDs between 10:00-10:30 am. This results in a list of 5 entries, where each entry has the same time period (10:00-10:30 am) and a different Log Stream ID.

Within one of the Log Stream IDs (Log Stream ID1), Term1 is determined by the computer 100 to occur 20 times in 20 Record IDs of Log Stream ID1. The computer 100 determines MinHash for the 20 Record IDs, and stores the MinHash with Log Stream ID1 in the term node. The computer 100 repeats the process for another one of the Log Stream IDs (Log Stream ID2), by determines MinHash for each of the Record IDs of Log Stream ID2 containing Term1, and stores the MinHash with Log Stream ID2 in the term node. The computer 100 similarly repeats this process for the other three Log Stream IDs and stores the stores the MinHashes with the corresponding Log Stream IDs in the term node.

The MinHash is used to detect self correlations. For example, if two defined terms occur in the same log stream and in the same time period then the MinHash values are compared to determine how frequently these two values occur together in that log stream.

For the same term (e.g. a user name), different log streams may represent the term using different values. An external master data source can be used to resolve the differences. However, resolving these differences may be a part of the discovery process by the log stream analysis computer 100, and term nodes can be merged if they are identified to be associated with the same user. The data dictionary repository 120 may therefore operate as an internal master data source for resolving differences between term nodes, and selectively merging term nodes based on a defined rule being satisfied.

In addition to the defined terms, the log stream analysis computer 100 may perform correlation between log streams in individual records of log streams based on identifiers of their software sources, identifiers for source types of software sources, and/or identifiers of hosts executing the software sources. The log stream analysis computer 100 may therefore generate data structures for host nodes and/or source type nodes that can be used by a system operator or system entity to determine further correlations between log streams and records thereof for debugging a problem for other analysis.

Figure 4:
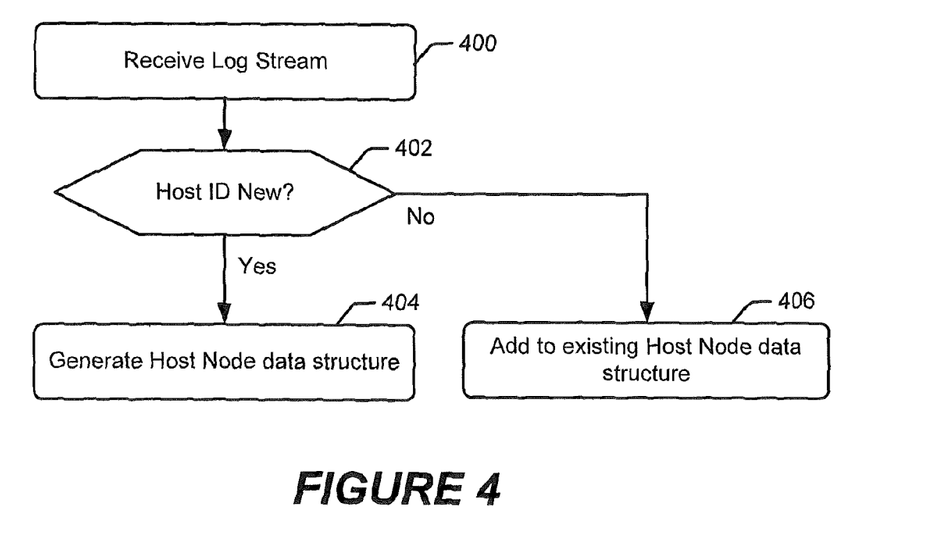
FIG. 4 is a flowchart of operations by a log stream analysis computer for generating data structures of host nodes in accordance with some embodiments.

FIG. 4 is a flowchart of operations by a log stream analysis computer, such as the computer 100 of FIG. 1, for generating data structures of host nodes in accordance with some embodiments. The log stream analysis computer 100 receives (block 400) a log stream, and identifies a host (Host ID) within the log stream. If the host (Host ID) is determined (block 402) to be new (e.g., a host node data structure does not yet exist), a host node data structure is generated (block 404) that contains a data structure that identifies the host (Host ID) and lists an identity of the software source (Source ID) of the log stream (Log Stream ID) and a defined type (Source Type ID) of the software source (Source ID). Alternatively, if the host (Host ID) is determined (block 402) to not be new (e.g., a host node data structure exists), information identifying the software source (Source ID) of the log stream (Log Stream ID) and a defined type (Source Type ID) of the software source (Source ID) is added (block 406) to an existing host node data structure corresponding to the host (Host ID).

Figure 5:
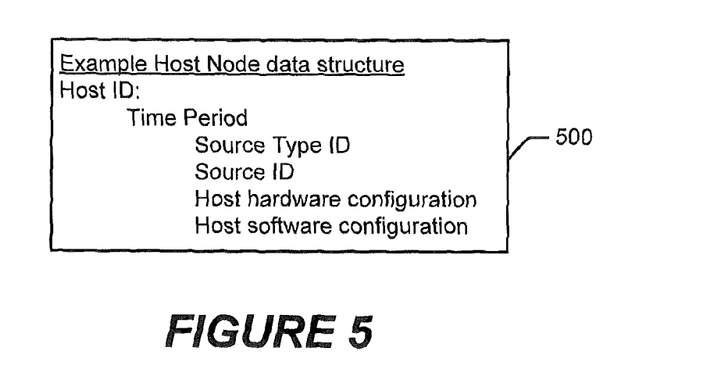
FIG. 5 illustrates an example data structure of a host node according to one embodiment.

FIG. 5 illustrates an example data structure 500 of a host node according to one embodiment. The data structure 500 includes information identifying a host (Host ID), and for each time period (e.g., Record ID), identifies the defined type (Source Type ID), the source ID, and may further identify a hardware configuration of the host and/or a software configuration of the host.

Another example host node data structure can include:

| Host Node |
|---|
| Host ID<br>List of <Time period,<br>    List of < Source Type ID, Source ID >,<br>    Host h/w & s/w & perf Info<br>    > |

The information stored in a host node may include the hardware configuration and the versions of the installed software. This will help an operator or other user to more easily identify the differences between two hosts or the changes in the same host over time. Any performance data being captured at a host may also be summarized over the time period and saved in the host node data structure.

Figure 6:
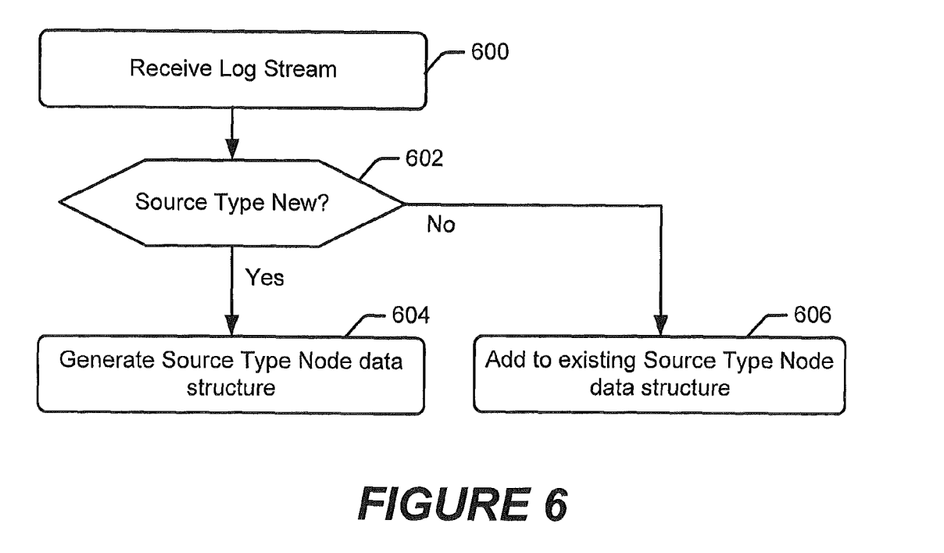
FIG. 6 is a flowchart of operations by a log stream analysis computer for generating data structures of source type nodes in accordance with some embodiments.

FIG. 6 is a flowchart of operations by a log stream analysis computer, such as the computer 100 of FIG. 1, for generating data structures of source type nodes in accordance with some embodiments. The log stream analysis computer 100 receives (block 600) a log stream, and identifies defined type of source (Source Type ID) within the log stream. If the source type (Source Type ID) is determined (block 602) to be new (e.g., source type node data structure does not yet exist), a source type data structure is generated (block 604) that contains a data structure that identifies the source type (Source Type ID) and lists identifiers of records of one of the log streams (e.g., Record IDs and/or time period identifiers) generated by the software source, identifies the software source (Source ID), and identifies one of the host nodes (e.g., Host ID) executing the software source.

Alternatively, if the source type (Source Type ID) is determined (block 602) to not be new (e.g., a source type node data structure exists), information identifying the software source (Source ID) and the host node (e.g., Host ID) executing the software source is added (block 606) to an existing source type node data structure.

Figure 7:
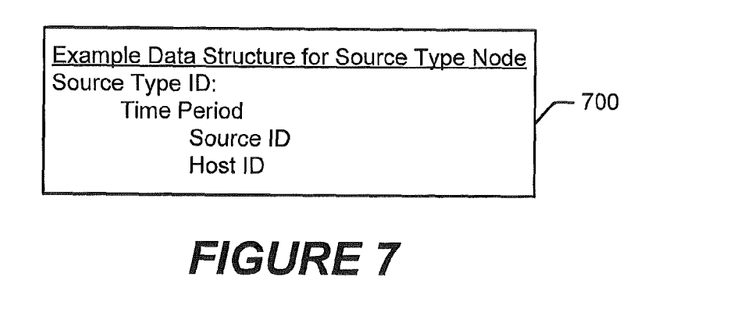
FIG. 7 illustrates an example data structure of a source type node according to one embodiment.

FIG. 7 illustrates an example data structure 700 of a source type node according to one embodiment. The data structure 700 includes information identifying a source type (Source Type ID), and for each time period (e.g., Record ID), identifies the software source (Source ID) and the host node (e.g., Host ID) executing the software source.

Another example source type node data structure can include:

| Source Type Node |
| --- |
| Source Type ID<br>List of <Time period,<br>    List of < Source ID + Host ID ><br>> |

The source type node can identify all software sources that belong to that type in each time period.

The node and correlation generator 130 of the log stream analysis computer 100 can determine correlations between the records of the log streams within the log repository 110 based on content of the data structure of the term node and a defined correlation rule. The correlation may be alternatively or additionally performed based on information contained in the data structure of the host nodes and/or the source type nodes.

For example, for each of a plurality of defined terms, the identifying of records, the determining of similarity values (e.g., MinHash values), and the generating a term node, can be repeated. Different ones of the term nodes correspond to different ones of the defined terms. Correlation between content of records of log streams within the log repository can be determined based on a defined correlation rule and content of the data structure of the term nodes, content of the data structure of the host nodes, and/or content of the data structure of the source type nodes.

The correlation operations can determine links between the generated nodes. For example, two nodes (or a node to itself) may be directly related based on time of a record or software source. For example, two values (terms) may occur in the same log stream at the same time, or a value may occur in the same or different log stream at different times. A link can be used to represent a direct relationship. Since a node can have a link to any node in any time period, in the worst case, the total number of possible links is of the order O(N*N) and the insertion time of a new time period at a node is O(N), where N=(total number of nodes*total number of time periods).

The links can be dynamically calculated based on the node being selected or otherwise determined of interest to an operator and the type of correlation the operator is performing. Hence to avoid the link overhead, the known correlation generator 130 may avoid storing any information for the links. Instead, the generator 130 can perform graph-walking operations to display and detect correlations across all the log streams and all the time periods.

Correlations can be discovered by a user or other operator traversing the graph from a starting node, to a next selected node, and so on, which can provide a more real-time interactive correlation discovery process for a user. To discover correlations, the user starts at a node. It could be a host that is having problems, a source that has become slow, a user whose activity needs to traced etc. Each of these entities is represented by a node in the graph. The user also defines the type of correlation the user is interested in. For example, the user may be interested in self correlations, to figure out what values occur together in the log records of a software source. So starting with a node, the node and correlation generator 130 dynamically calculates the links based on the defined type of correlation. The user can change focus to a new node based on the links discovered, to cause the correlation process to be repeated from the new node to other nodes. At every repetition, the user can define or redefine the type of correlation required to cause further correlations and determine new links to be added to the graph. The user also can delete defined ones of lines or all the links at any node at any point.

This process can also be automated and run as an offline job so that the correlations are discovered automatically without user or other operator intervention.

Figure 8:
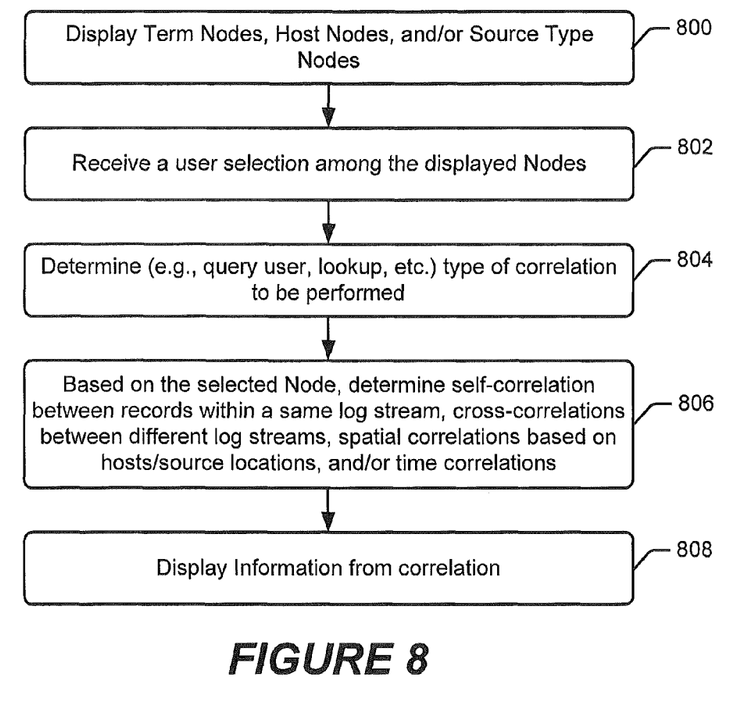
FIG. 8 is a flowchart of operations by a log stream analysis computer for determining correlations between records in one or more log streams responsive to selection among displayed term nodes, host nodes, and/or source type nodes in accordance with some embodiments.

FIG. 8 is a flowchart of operations by a log stream analysis computer, such as the computer 100 of FIG. 1, for determining correlations between records in one or more log streams responsive to user selection among displayed term nodes, host nodes, and/or source type nodes in accordance with some embodiments. Referring to FIG. 8, a node and graph illustrator 140 provides information based on content of the data structures of a plurality of term nodes, host nodes, and/or source type nodes for display on a display device. The display device may reside in user equipment 150, which may be operated by a user, a system operator, or by an analysis program.

The node and graph illustrator 140 receives (block 802) a selection among the displayed nodes. The selection may be performed by a user (e.g., who indicates a selection among the displayed nodes) and/or by an analysis program. The type of correlation that is to be performed is determined (block 804), such as by querying a user, looking up defined information (e.g., user settings, program settings), etc.

Based on the selected node and the type of correlation, the node and correlation generator 130 determines (block 806) self-correlations between records within a same log stream, cross correlations between different log streams, spatial correlations based on hosts and/or source locations, and/or time correlations using content of the term nodes, host nodes, source type nodes, and/or other types of nodes. The node and graph illustrator 140 can then display (block 808) information based on the determined correlations.

A system operator or analysis program may select another node among the nodes (which may be displayed on the display device) to cause further correlations to be performed between content of the data structure of that node and content of the data structure of other nodes. In this manner, a system operator or other user may, for example, select a node to cause correlations to be generated from that node to other nodes, and then select one of the other nodes to cause further correlations to be determined between that other selected node and yet other nodes. This process allows a system operator or other user to visually step through graphically illustrated nodes on a display screen to determine step-wise control the generation of correlations between nodes that are of interest to the system operator or other user. Performing step-wise generation of correlations between the nodes can substantially reduce the throughput requirements and delay associated with generating correlations. This may enable improved operator experience by providing more real-time and intuitive feedback of information determined through the correlation process.

In another more general embodiment in the context of correlation between term nodes, information can be provided based on content of the data structures of a plurality of term nodes for display on a display device. A selection of one of the term nodes displayed on the display device is received, and correlation between records of the log streams within the log repository is determined based on comparison of content of the data structure of the selected one of the term nodes to content of the data structures of other term nodes. Another term node is selected based on the comparison of content of the data structure of the selected one of the term nodes to content of the data structure of the other term node satisfying a defined correlation rule, and information is provided based on content of the data structure of the other term node for display on the display device.

In another embodiment in the context of correlation between host nodes, hosts are identified within the log streams. For each of a plurality of the hosts not corresponding to an existing host node, a host node is generated that contains a data structure that identifies the host and lists an identity of the software source of the log stream and a defined type of the software source. Correlation between records of the log streams within the log repository is determined based on content of the data structures of the host nodes.

Information is provided based on content of the data structures of a plurality of host nodes for display on a display device. A selection of one of the host nodes displayed on the display device is received, and correlation between records of the log streams within the log repository is determined based on comparison of content of the data structure of the selected one of the host nodes to content of the data structures of other host nodes. Another host node is selected based on the comparison of content of the data structure of the selected one of the host nodes to content of the data structure of the other host node satisfying a defined correlation rule, and information is provided based on content of the data structure of the other host node for display on the display device.

In another embodiment in the context of correlation between source type nodes, software sources are identified within the log streams. For each of a plurality of the software sources having a defined type not corresponding to an existing source type node, a source type node is generated containing a data structure that identifies the defined type of the software source and lists identifiers of records of one of the log streams generated by the software source, identifies the software source, and identifies one of the host nodes executing the software source. Correlation between records of the log streams is determined within the log repository based on content of the data structures of the source type nodes.

Information is provided based on content of the data structures of a plurality of source type nodes for display on a display device. A selection of one of the source type nodes displayed on the display device is received. Correlation between records of the log streams within the log repository is determined based on comparison of content of the data structure of the selected one of the source type nodes to content of the data structures of other source type nodes. Another source type node is selected based on the comparison of content of the data structure of the selected one of the source type nodes to content of the data structure of the other source type node satisfying a defined correlation rule. Information is provided based on content of the data structure of the other source type node for display on the display device.

Figure 9:
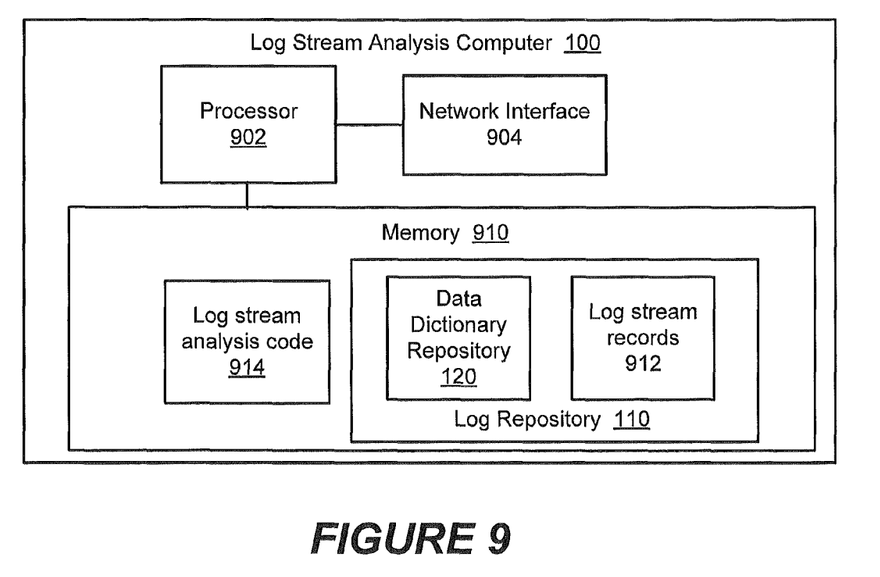
FIG. 9 is a block diagram of a log stream analysis computer configured according to some embodiments.

FIG. 9 is a block diagram of the log stream analysis computer 100 of FIG. 1 configured according to one embodiment. Referring to FIG. 9, a processor 902 may include one or more data processing circuits, such as a general purpose and/or special purpose processor (e.g., microprocessor and/or digital signal processor) that may be collocated or distributed across one or more networks. The processor 902 is configured to execute computer readable program code in a memory 910, described below as a computer readable medium, to perform some or all of the operations and methods disclosed herein for one or more of the embodiments. The program code can include log stream analysis code 914 is configured to perform one or more of the embodiments disclosed herein as being performed by the log repository 110, the node and correlation generator 130, the node and graph illustrator 140, and/or other elements associated with the log stream analysis computer 100 or the system of FIG. 1. The memory 910 may further include storage for the log repository 110 which includes a data dictionary repository 120 and log stream records 912. Although a single memory block 910 has been illustrated for simplicity, it is to be understood that any number and combination of types of memory storage devices (e.g., solid state, disk drive, etc.) can be used. A network interface 904 can communicatively connect the processor 902 to the log repository 110 and other components of the system, such as the host machine nodes and user equipment 150 shown in FIG. 1.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit" "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a log stream analysis computer comprising:
   identifying a set of records within log streams within a log repository containing a defined term and which are all constrained to being within a time period, wherein the log streams are generated by respective software sources executed by the host nodes characterizing performance data captured by the respective software sources over the time period;
   determining similarity values that indicate similarity between content of the records containing the defined term in the time period;
   generating a term node comprising a data structure that identifies the defined term and lists identities of the records containing the defined term in the time period and corresponding ones of the similarity values in the time period;
   identifying hosts within the log streams;
   for each of a plurality of the hosts not corresponding to an existing host node, generating a host node comprising a data structure that identifies the host and lists an identity of a hardware configuration of the host, an identity of the software source of the log stream, and a defined type of the software source; and
   determining correlation between records of the log streams within the log repository based on content of the data structures of the host nodes.

2. The method of claim 1 further comprising:
   determining correlation between the records of the log streams within the log repository based on content of the data structure of the term node and a defined correlation rule.

3. The method of claim 1 further comprising:
   repeating for each of a plurality of defined terms, the identifying records, the determining similarity values, and the generating a term node, wherein different ones of the term nodes correspond to different ones of the defined terms; and
   determining correlation between content of records of log streams within the log repository based on content of the data structure of the term nodes and a defined correlation rule.

4. The method of claim 3, further comprising:
   providing information based on content of the data structures of a plurality of term nodes for display on a display device;
   receiving a selection of one of the term nodes displayed on the display device; and
   determining correlation between records of the log streams within the log repository based on comparison of content of the data structure of the selected one of the term nodes to content of the data structures of other term nodes.

5. The method of claim 4, further comprising:
   selecting another term node based on the comparison of content of the data structure of the selected one of the term nodes to content of the data structure of the other term node satisfying a defined correlation rule; and
   providing information based on content of the data structure of the other term node for display on the display device.

6. The method of claim 1 wherein:
   determining similarity values comprises calculating minwise independent permutation locality sensitive hashing (MinHash) values of content of the records containing the defined term; and
   generating the term node comprises storing the MinHash values associated with corresponding ones of the records in the data structure of the term node.

7. The method of claim 6 further comprising:
   counting a number of occurrences of the defined term in each of the records containing the defined term; and
   generating the term node comprises storing the number of occurrences associated with corresponding ones of the records in the data structure of the term node.

8. The method of claim 1,
   further comprising based on the defined term not being present in a data dictionary containing lists of terms and corresponding term value identifiers, adding the defined term and a corresponding term value identifier to the data dictionary; and
   wherein the defined term is identified in the data structure by the corresponding term value identifier from the data dictionary.

9. The method of claim 1, further comprising:
   providing information based on content of the data structures of a plurality of host nodes for display on a display device;
   receiving a selection of one of the host nodes displayed on the display device; and
   determining correlation between records of the log streams within the log repository based on comparison of content of the data structure of the selected one of the host nodes to content of the data structures of other host nodes.

10. The method of claim 9, further comprising:
    selecting another host node based on the comparison of content of the data structure of the selected one of the host nodes to content of the data structure of the other host node satisfying a defined correlation rule; and
    providing information based on content of the data structure of the other host node for display on the display device.

11. A method by a log stream analysis computer comprising:
    identifying a set of records within log streams within a log repository containing a defined term and which are all constrained to being within a time period, wherein the log streams are generated by respective software sources executed by the host nodes characterizing performance data captured by the respective software sources over the time period;

determining similarity values that indicate similarity between content of the records containing the defined term in the time period;

generating a term node comprising a data structure that identifies the defined term and lists identities of the records containing the defined term in the time period and corresponding ones of the similarity values in the time period;

identifying software sources within the log streams;

for each of a plurality of the software sources having a defined type not corresponding to an existing source type node, generating a source type node containing a data structure that identifies the defined type of the software source and lists identifiers of records of one of the log streams generated by the software source, identifies the software source, and identifies one of the host nodes executing the software source; and determining correlation between records of the log streams within the log repository based on content of the data structures of the source type nodes.

12. The method of claim 11, further comprising:

providing information based on content of the data structures of a plurality of source type nodes for display on a display device;

receiving a selection of one of the source type nodes displayed on the display device; and determining correlation between records of the log streams within the log repository based on comparison of content of the data structure of the selected one of the source type nodes to content of the data structures of other source type nodes.

13. The method of claim 12, further comprising:

selecting another source type node based on the comparison of content of the data structure of the selected one of the source type nodes to content of the data structure of the other source type node satisfying a defined correlation rule; and providing information based on content of the data structure of the other source type node for display on the display device.

14. A log stream analysis computer comprising:

a processor; and a memory coupled to the processor, the memory comprising a non-transitory computer readable storage medium having computer readable program code embodied in the medium that when executed by the processor causes the processor to perform operations comprising:

identifying a set of records within log streams within a log repository containing a defined term and which are all constrained to being within a time period, wherein the log streams are generated by respective software sources executed by the host nodes characterizing performance data captured by the respective software sources over the time period;

determining similarity values that indicate similarity between content of the records containing the defined term in the time period;

generating a term node comprising a data structure that identifies the defined term in the time period and lists identities of the records and corresponding ones of the similarity values in the time period;

identifying one of hosts and software sources within the log streams;

responsive to identifying hosts within the log streams, for each of a plurality of the hosts not corresponding to an existing host node, generating a host node containing a data structure that identifies the host and lists an identity of a hardware configuration of the host, an identity of the software source of the log stream, and a defined type of the software source;

responsive to identifying software sources within the log streams, for each of a plurality of the software sources having a defined type not corresponding to an existing source type node, generating a source type node containing a data structure that identifies the defined type of the software source and lists identifiers of records of one of the log streams generated by the software source, identifies the software source, and identifies one of the host nodes executing the software source; and determining correlation between records of the log streams based on content of the data structures of the term nodes and based on content of one of the data structures of the host nodes and the data structures of the source type nodes.

15. The log stream analysis computer of claim 14, wherein the operations further comprise:

repeating for each of a plurality of defined terms, the identifying records, the determining similarity values, and the generating a term node, wherein different ones of the term nodes correspond to different ones of the defined terms; and determining correlation between content of records of log streams within the log repository based on content of the data structure of the term nodes and a defined correlation rule.

16. The log stream analysis computer of claim 15, wherein the operations further comprise:

providing information based on content of the data structures of a plurality of term nodes for display on a display device;

receiving a selection of one of the term nodes displayed on the display device; and determining correlation between records of the log streams within the log repository based on comparison of content of the data structure of the selected one of the term nodes to content of the data structures of other term nodes.

17. The log stream analysis computer of claim 16, wherein the operations further comprise:

selecting another term node based on the comparison of content of the data structure of the selected one of the term nodes to content of the data structure of the other term node satisfying a defined correlation rule; and providing information based on content of the data structure of the other term node for display on the display device.

18. The log stream analysis computer of claim 15, wherein:

determining similarity values comprises calculating min-wise independent permutation locality sensitive hashing (MinHash) values of content of the records containing the defined term; and generating the term node comprises storing the MinHash values associated with corresponding ones of the records in the data structure of the term node.

19. The log stream analysis computer of claim 15, wherein the operations further comprise:

generating other ones of the term node for other defined terms contained in records of the log streams.

* * * * *